United States Patent
Johnson

(10) Patent No.: US 6,510,759 B2
(45) Date of Patent: Jan. 28, 2003

(54) FORCE COUPLING TRANSFER DEVICE

(76) Inventor: Robert E. Johnson, 134 C Hatcher La., Hendersonville, TN (US) 37075

( * ) Notice: Subject to any disclaimer, the term of this patent is extended or adjusted under 35 U.S.C. 154(b) by 13 days.

(21) Appl. No.: 09/759,203

(22) Filed: Jan. 16, 2001

(65) Prior Publication Data

US 2002/0092373 A1 Jul. 18, 2002

(51) Int. Cl.$^7$ ................................................ F16C 1/10
(52) U.S. Cl. ..................................................... 74/502.4
(58) Field of Search ............................. 74/501.5, 500.5, 74/502.4, 502.5, 502.6, 501.5 R; 267/289, 290; 57/25

(56) References Cited

U.S. PATENT DOCUMENTS

| | | | | |
|---|---|---|---|---|
| 736,333 A | * | 8/1903 | Meyer | 267/155 |
| 2,180,442 A | * | 11/1939 | Tondeur | 74/502.5 |
| 2,821,092 A | | 1/1958 | Cordora et al. | 74/501 |
| RE25,543 E | * | 3/1964 | Ruegg et al. | 464/58 |
| 3,237,477 A | | 3/1966 | Matz | 74/501 |
| 4,106,527 A | * | 8/1978 | Schmidt | 138/131 |
| 4,321,840 A | | 3/1982 | Kalamon | 74/501 R |
| 4,339,213 A | * | 7/1982 | Gilmore | 403/316 |
| 4,378,712 A | | 4/1983 | Yoshifuji | 74/501 R |
| 4,429,777 A | * | 2/1984 | Taig | 192/111 A |
| 5,052,404 A | * | 10/1991 | Hodgson | 128/772 |
| 5,243,876 A | | 9/1993 | Mang et al. | 74/502.5 |

FOREIGN PATENT DOCUMENTS

GB        459874        2/1937

* cited by examiner

Primary Examiner—David A. Bucci
Assistant Examiner—Vicky A. Johnson
(74) Attorney, Agent, or Firm—Banner & Witcoff, LTD.

(57) ABSTRACT

A force coupling transfer device for use in marine equipment, snowmobiles, boats, automobiles, machinery, aircraft, recreational vehicles and other industries. The force coupling transfer device allows linear or rotational forces to be transferred from an input device to a controlled device. The force coupling transfer device includes an elongated flexible outer sheath and a movable flexible inner spring member. The inner spring member substantially transfers forces between two remote points located in a control space. The elongated flexible outer sheath is preferably a coiled spring and allows lubricating materials to pass through the surface to lubricate the inner spring member. A strain relief device, which may be a coiled spring, is preferably positioned around the outer sheath, adjacent to its ends, to prevent excessive bending of the outer sheath.

11 Claims, 4 Drawing Sheets

FORCE COUPLING TRANSFER DEVICE

FIELD OF THE INVENTION

This invention relates to controllers or power transfer devices of the type that include a movable cable or element traveling inside a conduit. More specifically this invention relates to a force coupling transfer device that allows linear or rotational forces to be transferred between an input device and a controlled device.

BACKGROUND OF THE INVENTION

Control and power transmission technology is important to consumers and industry. These devices are used in a variety of applications from aircraft, automotive, marine, snowmobiles, machine control, and home appliance markets. This technology involves controlling the movement of parts or devices when linear or rotational force is transferred from one end of an elongated element to the other end. For example, this technology is generally directed to transfer forces from an input device, such as a lever or control pedal, to a controlled device, such as a motor controller, brake, clutch, or accelerator.

Control devices of this type generally have an elongated guide conduit and an elongated core element such as a cable made from woven metal strands, or a solid wire that moves inside of the guide conduit. These control devices may be susceptible to premature wear between the movable core element and the interior surface of the guide conduit because of ineffective lubrication. Further, lubricating an inner movable core element while inside the guide conduit can be difficult or impossible as the guide conduit surface construction that does not usually allow lubricating materials to pass therethrough. Coatings such as tetrafluoro polyethylene (Telfon) have been used as an inner tube liner to minimize the effects of friction and wear. However, this solution may be undesirable in some applications because it can be expensive and deteriorates over time.

In addition, some movable core elements, especially cables, tend to kink inside the guide conduit in response to inadvertent flexing. Kinking is undesirable for dependable operations and can lead to improper force transfer from the input device to the controlled device, and premature concentrated stress failure at the kink.

Thus with a woven cable, the inner cable begins to fail with the break of one strand at a kink. If a solid core is used, it begins to fail as a concentrated stress cracks the outer surface and it works its way through the cable for complete failure. Thus, even a seemingly minor kink or crack with the prior art can result in total failure.

Additionally, a shock load on a woven or solid core cable can also start, propagate, or complete failure because the cable has no ability to give without losing strength to withstand the load.

Still other force transfer devices in the art do not allow convenient, flexible routing through a control space, thus increasing cost to design additional parts. Existing devices also have additional drawbacks in power transmission because some installations of such controls require the conduit and movable core element to be bent in sharp angles which can cause excessive binding and kinking of the inner core element. Thus, a force transfer device minimizing and overcoming these and other drawbacks was needed.

SUMMARY OF THE INVENTION

In view of the foregoing, the present invention is directed to an improved force coupling transfer device for transferring linear and/or rotational forces that overcomes the aforementioned drawbacks in the conventional control technology.

An object of the invention is to substantially eliminate the kinking associated with existing technology. Kinking is reduced by utilizing an elongated flexible inner coiled spring positioned inside of an elongated flexible outer sheath that is supported at each end.

Yet another object of the invention is to substantially reduce a portion of the operational cost associated with mechanical actuator control devices in a machinery control environment. Due to the present invention, the elongated flexible outer sheath has the ability to allow lubricating liquids to pass through the outer surface to lubricate the inner coiled spring. This reduces wear between the inner coiled spring and the outer sheath. This advantage can save replacement and maintenance costs associated with labor, materials, and machinery equipment downtime.

These and other objects are achieved by the present invention, which according to one aspect, provides a force coupling transfer device for transferring a force that includes an elongated flexible outer sheath that has a center axis, and an elongated flexible inner coiled spring positioned inside of the outer sheath for movement. The inner coiled spring has an opposing first and second ends and transfers a force applied to the first end to the second end. The inner coiled spring also has a center axis. The outer sheath is permeable along its length to permit lubrication of the inner coiled spring.

In addition, the inner coiled spring sheath reduces the initial shock load from a force in either a pull or rotational operation which will reduce the failure potential of a rigid inner connector. The inner coiled spring activates the controlled equipment in a push or pull operation. Initial shock load on the coiled spring in the pull mode is relieved by a slight elongation of the inner coiled spring at the beginning of pull actuation.

Another object of the invention is to reduce the strain on the elongated flexible outer sheath. One aspect of the present invention provides at least one strain relief device disposed around the outer sheath. The strain relief device reduces strain on the ends of the outer sheath where the outer sheath is most likely to be damaged.

Another object of the invention is to control the operation of a device at a remote location to allow a human operator to perform multiple tasks in a manufacturing environment. This aspect to the invention provides for a force transfer system for use in machinery or equipment that has an input device, a controlled device, an elongated flexible outer conduit having opposing ends and an elongated flexible inner spring disposed inside of the outer conduit for movement. The inner spring also has first and second ends. The input device connects to the first end and the controlled device connects to the second end of the spring. The inner spring provides a force to the controlled device in response to force at the input device.

These and other objects and features of the invention will be apparent upon consideration of the following detailed description thereof, presented in connection with the following drawings in which like reference numerals identify the elements throughout.

DETAILED DESCRIPTION OF THE PREFERRED EMBODIMENT

Figure 1:
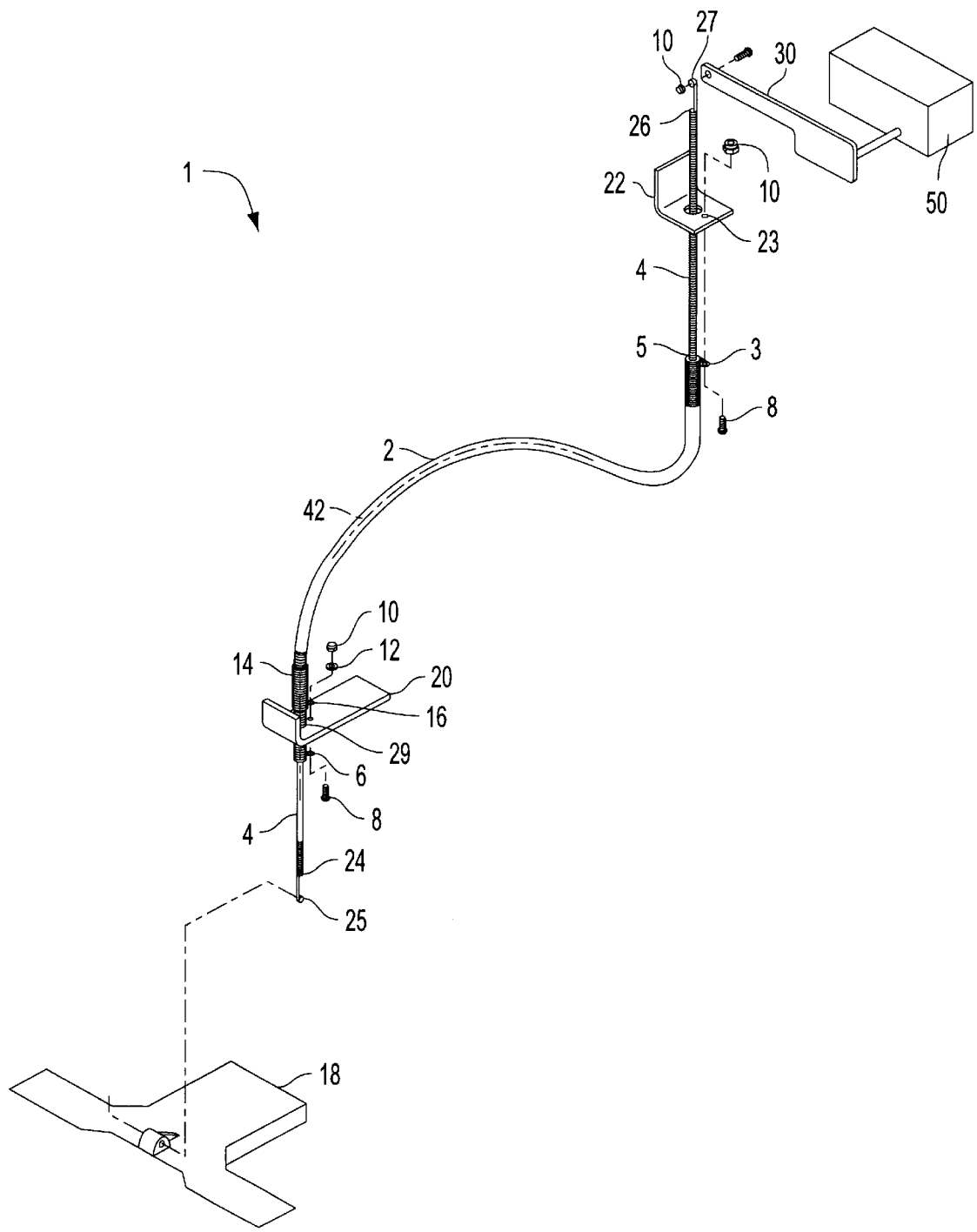
FIG. 1 is an isometric view of the force transfer device preferred embodiment of the present invention with the input device and the controlled device attached to opposing ends of the elongated inner coiled spring.

FIGS. 1–4, show a preferred embodiment of the present invention generally referred to as a force coupling transfer device 1 that functions to control the operation of a motor or engine upon the application of a force to an input device 18, such as a control pedal. The force coupling transfer device 1 substantially transfers an axial force generated from an input device 18 to a controlled device 30. An elongated inner coiled spring 4 is disposed inside of an outer sheath 2 for movement in response to a force. While the preferred embodiment transfers a linear force (e.g., push or pull), the force coupling transfer device 1 also has the capability to transfer a rotational force from the input device 18 to a controlled device 30.

Referring to FIG. 1, an elongated inner coiled spring 4 is located inside of an elongated flexible outer sheath 2. The outer sheath 2 is preferably also a coiled spring. Alternatively, the outer sheath 2 can be a flexible tubular conduit in lieu of a coiled spring. The outer sheath 2 is connected at its ends to a lower support bracket 20 and an upper support bracket 22. The lower 20 and upper 22 support brackets are typically disposed at or adjacent to the input device 18 and the controlled device 30, respectively, and are preferably fixed relative to the movable inner coiled spring 4. The inner coiled spring 4 has a lower end 24 and an upper end 26. The lower end 24 is preferably coupled to the input device 18 and the upper end 26 is preferably coupled to the controlled device 30.

Figure 2:
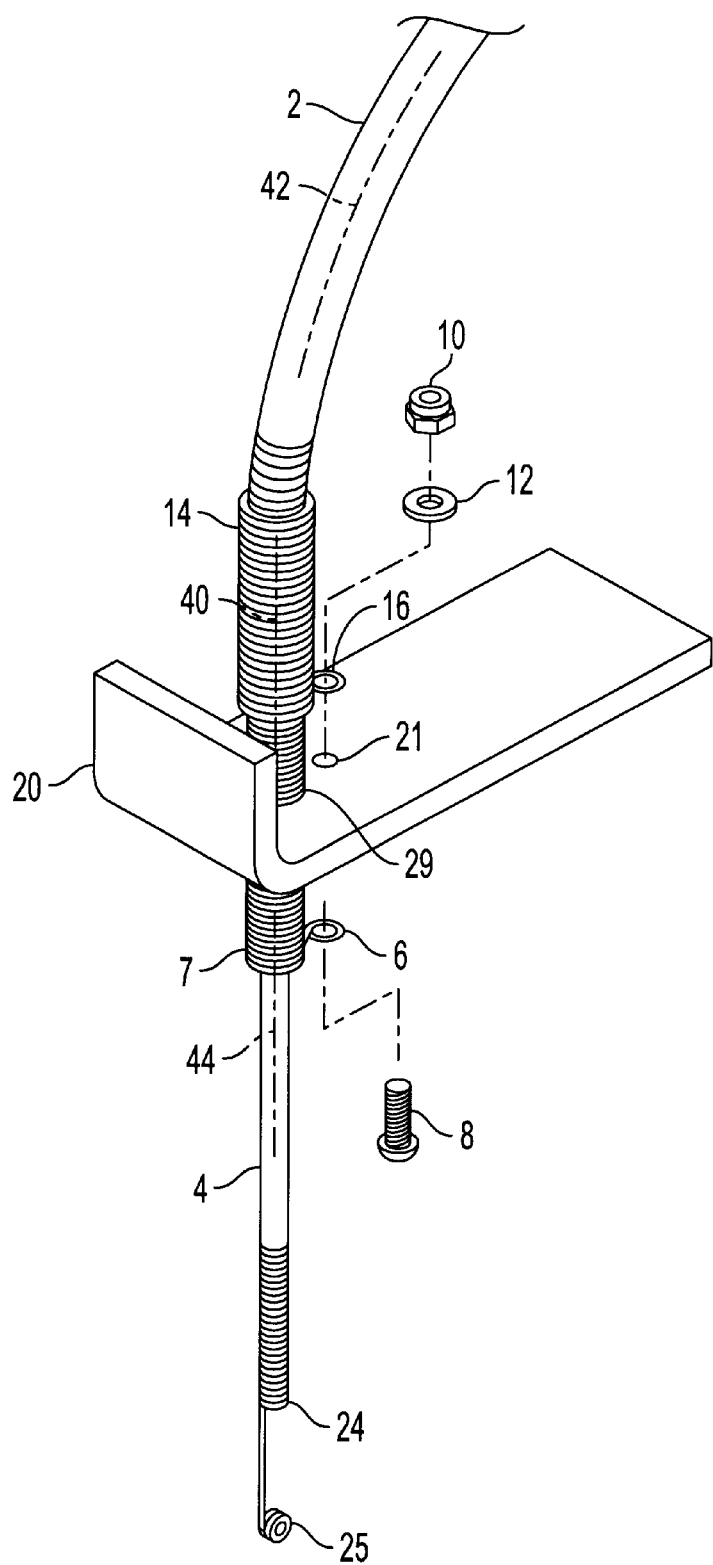
FIG. 2 is an isometric view of one end of the force transfer device.
Figure 3:
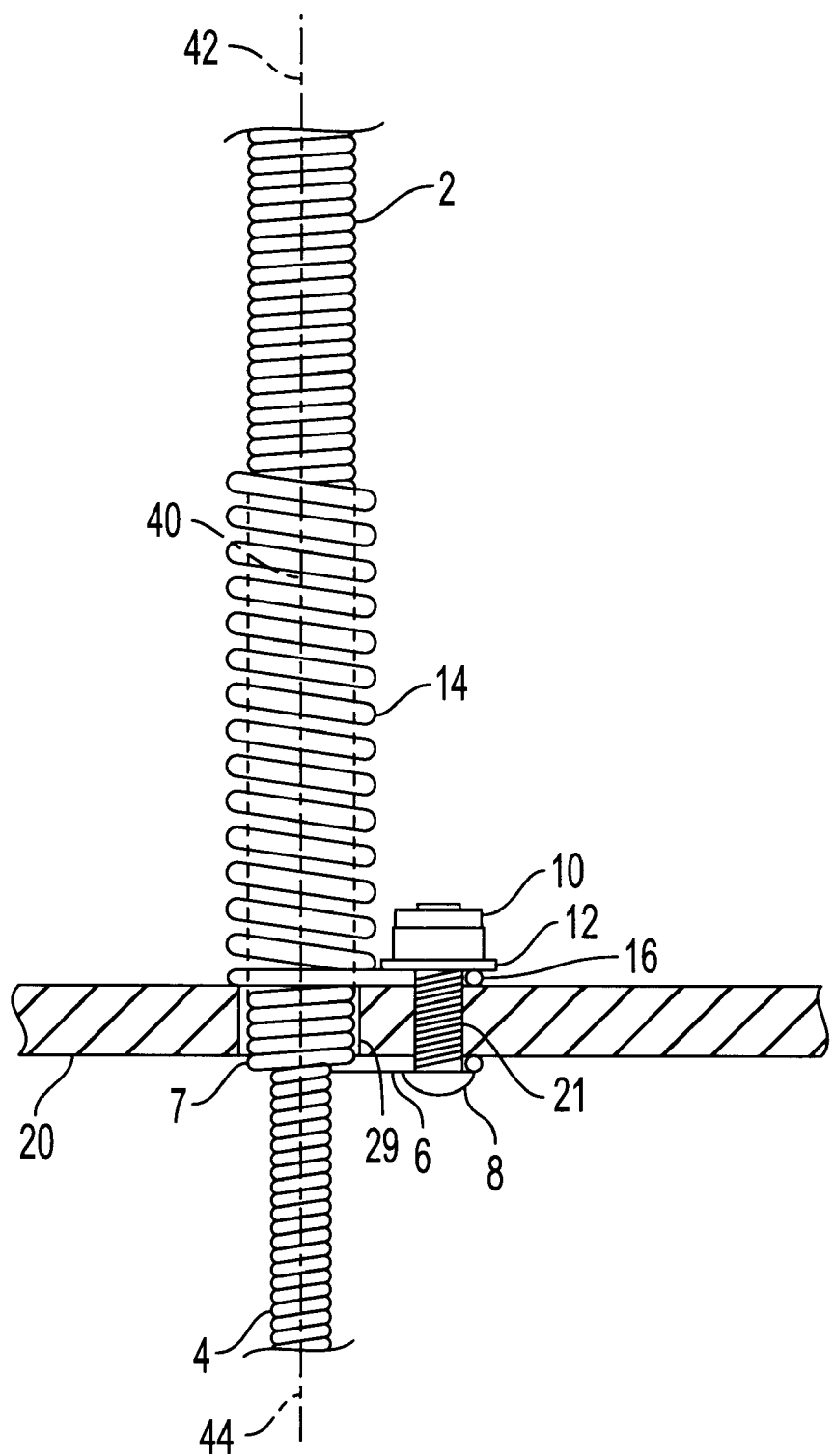
FIG. 3 is a side view of one end of the force transfer device showing a strain relief device in an assembled position attached to a support bracket.

Referring to the lower portion of the force coupling transfer device 1, as shown in FIGS. 1–3, the input device 18 is preferably connected to the lower end 24 of the elongated inner coiled spring 4 so that movement of the input device 18 causes the inner coiled spring 4 to move. The lower end 24 of the inner coiled spring 4 preferably has a connecting loop 25 formed from the wire of the inner coiled spring 4.

The connecting loop 25 of the inner coiled spring 4 is preferably coupled to the input device 18 by standard fastening hardware, not shown, such as screws, or bolts and nuts. Other fastening techniques for attaching the elements together may be employed. The connecting loop 25 may be in the shape of a circle. As shown in FIG. 2, the connecting loop 25 is preferably located on an extension of the elongated inner coiled spring 4, in which the extension is generally parallel to the center axis of the elongated inner coiled spring 4. However, the connecting loop 25 can be of any orientation or shape to interface with the input device 18.

The lower support bracket 20 provides a supporting structure for the elongated flexible outer sheath 2 and a strain relief device 14. The lower support bracket 20 can be part of or attached to a larger structure, such as the device to be controlled like a sewing machine control platform (not shown) or an automobile floor board or dash board (not shown). The lower support bracket 20 includes a hole 21 to facilitate the alignment and the coupling of the outer sheath 2 and the strain relief device 14 to each other and to the support bracket 20. A supporting structure other than a support bracket as shown may be employed.

The outer sheath 2 is preferably connected to the lower support bracket 20 so that the outer sheath 2 remains relatively stationary to allow movement of the inner coiled spring 4. When the outer sheath 2 is a coiled spring, the end 7 preferably includes a connecting loop 6 formed from the wire of the coiled spring.

FIGS. 2–3 show the connecting loop 6 protruding from the outer sheath 2 in a direction substantially perpendicular to the center axis of the outer sheath 2. In addition, the connecting loop 6 is preferably fastened to the lower support bracket 20 by hardware, such as a bolt 8, and a washer 12, and nut 10. The bolt 8 extends through the connecting loop 6 and hole 21 of the lower support bracket 20 in which the washer 12 and nut 10 are coupled to the bolt 8.

As best shown in FIG. 3, a strain relief device 14 is disposed around the outer sheath 2 to provide additional support, when needed, to reduce the stresses and strains on the end 7 and the connecting loop 6 of the outer sheath 2. The strain relief device 14 also protects the outer sheath 2 and the inner spring 4 from being excessively bumped or bent from undesirable forces at their lower end. Also device 14 protects the lower end 7 of the outer sheath 2 and the lower end 24 of the inner spring. Preferably, it extends approximately two inches in length to protect the most vulnerable location of the outer sheath 2 and the inner spring 4. The stresses and strains occur when the outer sheath 2, produces a bending moment near the connection of the lower support bracket 20 or the upper support bracket 22. The strain relief device 14 reduces the amount of stress and strain on the outer sheath 2 by providing a small counter-balancing bending moment at the appropriate location. The strain relief device 14 is preferably a coiled spring that has an end in the form of a connecting loop 16 formed integrally from the wire of the spring. The connection loop 16 of the strain relief device 14 protrudes away from the center longitudinal axis 40 of the strain relief device 14 such that a horizontal plane of the loop 16 is generally perpendicular to the center longitudinal axis 40.

Referring to FIGS. 2–3, the fastening hardware that connects the elongated flexible outer sheath 2 to the lower support bracket 20, also couples the strain relief device 14 to the lower support bracket 20. The bolt 8 extends through the connecting loop 6 of the outer sheath 2, the hole 21 in the bracket 20, and the connecting loop 16 of the strain relief device 14, and is attached on the other side of the bracket by washer 12 and nut 10. The bolt 8, washer 12, and nut 10 configuration serves a dual purpose of coupling both the outer sheath 2 and strain relief device 14 to each other and to the lower support bracket 20. The outer sheath 2 is further protected from strain as it penetrates hole 29 by the inside wall of the hole 29. This design reduces material, assembly costs and provides faster assembly of the force coupling transfer device 1. Although this configuration is preferable, other connecting and supporting structures could be employed.

Figure 4:
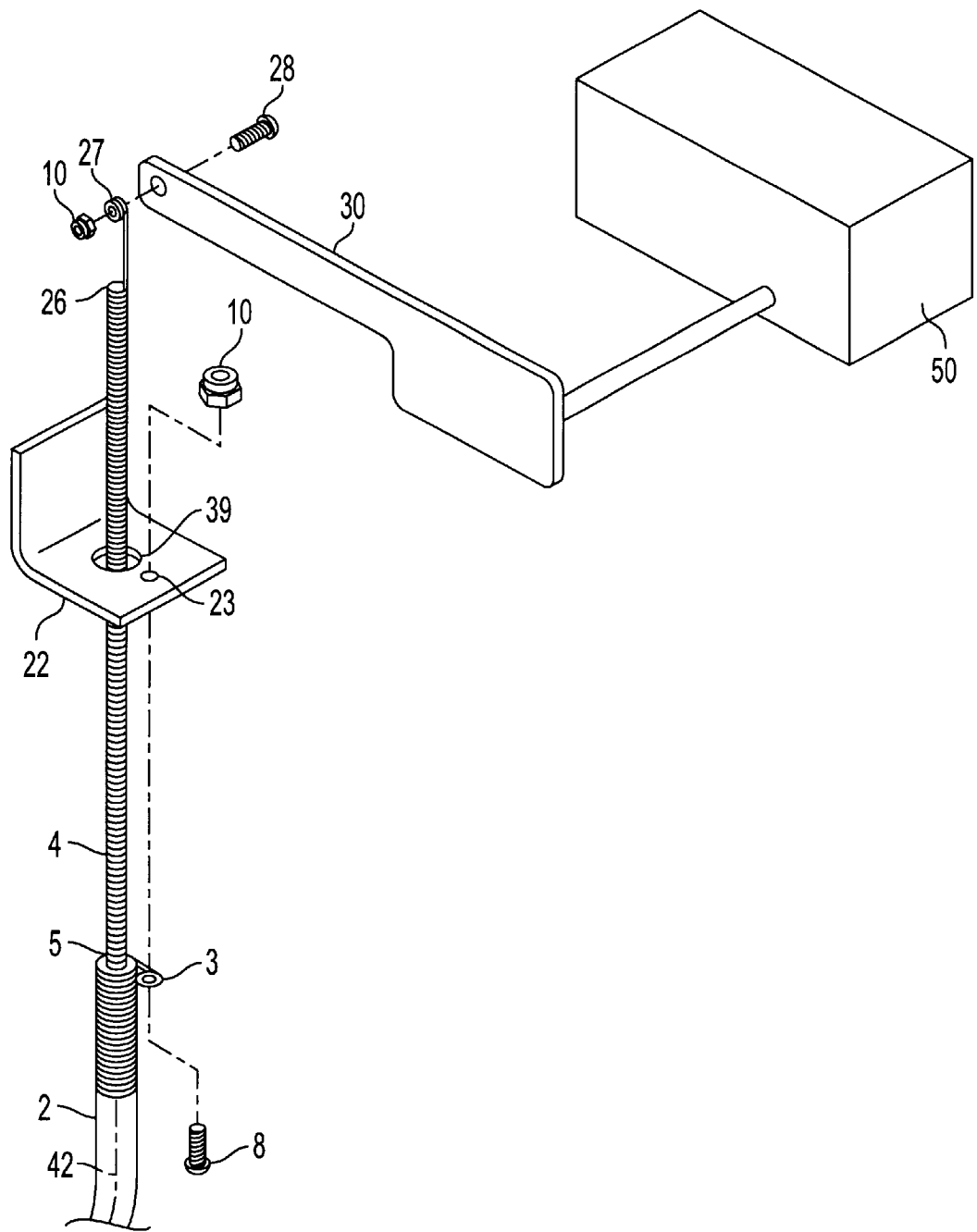
FIG. 4 is an isometric view of the other end of the force transfer device coupled to a controlled device.

Referring to FIGS. 1 and 3, the elongated flexible outer sheath 2 preferably includes a center longitudinal axis 42 running throughout the length of the outer sheath 2. Similarly, the elongated inner coiled spring 4 includes an individual center longitudinal axis 44. Also, the strain relief device 14 preferably includes a center longitudinal axis 40. As shown in FIG. 3, the center longitudinal axis 40, 42, 44 are generally co-incident in the vicinity of the lower support bracket 20. As shown in FIG. 4, the center longitudinal axis 42, 44 are also generally co-incident near the upper support bracket 22.

Referring to the upper portion of the force coupling transfer device 1, as can be seen from FIGS. 1 and 4, the upper end 26 of the elongated inner coiled spring 4 is connected to the controlled device 30 so that movement of input device 18 causes movement of the controlled device 30. The controlled device 30 is coupled to motor or engine element 50. Similar to the lower end 24, the upper end 26 of the inner coiled spring 4 includes a connecting loop 27 in the form of a circle. The connecting loop 27 is preferably coupled to the controlled device 30 by fastening hardware such as a machine bolt 28, and a nut 10. As shown in FIG. 4, the connecting loop 27 is preferably located on an extension of the inner coiled spring 4, in which the extension is generally parallel to the center longitudinal axis 44 of the inner coiled spring 4. As shown in FIG. 4, the center axis of loop 27 is perpendicular to longitudinal axis 44 of the inner coiled spring 4.

Similarly in the case of the lower support bracket 20, the elongated flexible outer sheath 2 is preferably connected to the upper support bracket 22 so that the outer sheath 2 remains stationary to allow movement of the elongated inner coiled spring 4. When the outer sheath 2 is a coiled spring as shown, the upper end 5 preferably includes a connecting loop 3 formed from the wire of the coiled spring. The connecting loop 3 is preferably fastened to the upper support bracket 22 by fastening devices such as a bolt 8, and washer (not shown), and nut 10. The bolt 8, extends through the connecting loop 3 of the outer sheath 2 and is affixed by a washer and nut 10 to thereby couple the outer sheath 2 to the upper support bracket 22. In an alternative embodiment, the outer sheath 2 may extend through the hole 39 in the upper support bracket 22, similar to its arrangement relative to the lower support bracket 20, so that the connecting loop 6 is on the side of the bracket 22 opposite from the body of the sheath 2.

The upper support bracket 22 provides a supporting structure for the elongated flexible outer sheath 2 so that the outer sheath 2 remains relatively fixed in relation to the elongated inner coiled spring 4. The upper support bracket 22 includes a hole 23 to facilitate the connection of the outer sheath 2 to the support bracket 22. The upper support bracket 22 is preferably fastened to a larger structure, such as the motor controller for a sewing machine, automobile floor or dashboard, or other motor or engine controlled device (not shown). It is recognized that the support bracket 22 may take other forms from what is shown and it is used primarily to maintain the outer sheath 2 in a fixed position.

If desired, a strain relief device can be employed at the interface between the upper support bracket 22 and the outer sheath 2 in the vicinity of the end 5 similar to strain relief device 14 at the lower end 7. While not shown in the Figures, a strain relief device such as shown in FIG. 3 may be used at the upper end 5 of outer sheath 2 and coupled to the bracket 22 in a similar manner. If a strain relief device is used, it can be fastened to the upper support bracket 22 by hardware similar to what is shown in FIG. 3 for the lower end 7.

The outer sheath 2 preferably is an elongated tubular coiled spring. The outer sheath 2 is permeable throughout its length such that when the windings are slightly extended or opened, liquids such as lubricants, can pass through the elongated flexible outer sheath 2 to the elongated inner coiled spring 4. In such an arrangement, the outer sheath 2 is preferably constructed from stainless steel to provide high durability, corrosion resistance, and tensile strength for corrosive and high load duty cycle environments. When the windings are in substantial contact, the lubricant is primarily retained inside of the outer sheath 2 and between the outer sheath 2 and inner coiled spring 4. If desired, the outer sheath 2 can be composed of a flexible metal tube, or a polymer material in the shape of a tube that has holes or slots that allow the outer sheath 2 to be permeable. This alternative design would allow the lubricant to pass through the holes or slots in outer sheath 2 in a non-spring design or the inner spring 4 can be filled with a lubricant to lubricate between inner spring 4 and outer sheath 2 from the inside outward.

The elongated inner coiled spring 4 is preferably also tubular and also constructed from stainless steel. However, other materials may be utilized instead of stainless steel for the inner coiled spring 4. The strain relief device 14 is also preferably a tubular coiled spring and is also composed of stainless steel. Other materials and constructions, however, may be employed for the strain relief device 14 in lieu of a coiled stainless steel spring.

Operating the system provides an effective method of transferring a force and associated motion. One such way the force coupling transfer device 1 can function is when a force generated by the input device 18 is transferred to the controlled device 30. The controlled device 30 can be coupled to a motor or engine controller 50 that stops, starts, or controls the speed of various types of automobile engines or other engines or motors for machinery such as a sewing machine. The input device 18, such as a foot or control pedal, is coupled to the lower end 24 of the inner coiled spring 4, via connecting loop 25, and the controlled device 30 attaches to the upper end 26 of the inner coiled spring 4 via connecting loop 27. In this situation, the force coupling transfer device 1 can be used to operate machinery or engine when a human operator energizes the input device 18. The controlled action on the input device 18 by an operator initiates a downward axial or linear force that pulls the lower end 24 of the inner coiled spring 4. As the elongated flexible outer sheath 2 is fixed relative to the inner coiled spring 4, the spring 4 will move downward and with respect to the outer sheath 2 in response to the axial force and substantially the same axial force pulls down on the upper end 26 of the inner coiled spring 4. Thus, this same downward force is transferred to the controlled device 30.

Likewise, if desired, a force on the input device 18 in the opposite direction creates an upward axial or linear force thereby pushing the lower end 24 of the elongated inner coiled spring 4 upward to substantially transfer the force to the upper end 26 of the elongated inner coiled spring 4.

The operating system, if desired, can be used with an input device 18 and a controlled device 30 that are rotatable about the center longitudinal axis 44 of inner spring 4. Under such an arrangement, a rotational force generated from the input device 18 is transferred to the controlled device 30. The input device 18, such as a crank, connects to the lower end 24 and the controlled device 30 connects to the upper end 26 of the elongated inner coiled spring 4. The connecting loops 25 and 27 can be adapted to accept the input device 18 and the controlled device 30, respectively. The action of the input device 18 causes a clockwise or counter clock rotational force at the lower end 24 of the inner spring 4. The same rotational force is substantially transferred to the upper end 26 and the controlled device 30 in two simultaneous operations. Depending on the application, the rotational force can be transferred in both push or pull control situations.

Any non-negligible possible loss of force in a linear or rotation force transfer can be mitigated or eliminated by reducing the frictional contact of the surfaces. The frictional contact may be reduced by lubricating the exterior surface of the inner coiled spring 4 and the interior surface of the outer sheath 2. When the outer sheath 2 is a coiled spring, the windings can be slightly extended or stretched to allow lubricant to pass to the elongated inner coiled spring 4. Alternatively, the lubricant may be injected inside of the inner coiled spring 4 to allow the lubricant to flow into the outer sheath 2.

In addition, the coupling location of the input device 18 and the controlled device 30 can be interchanged as this device works without regard to orientation. The input device 18 can be coupled to the connecting loop 27 at the upper end 26 of the inner coiled spring 4. Also, the controlled device 30 can be coupled to the connecting loop 25 at the lower end 24 of the inner coiled spring 4.

If desired, device 1 can operate without a strain relief device 14 so that the elongated flexible outer sheath 2 remains exposed throughout its entire length. In addition, the lower end 24 and upper end 26 of the inner coiled spring 4 can be exposed.

Additionally, the present invention may be used to couple two input devices together. Such an arrangement may be advantageous in certain circumstances. Such an arrangement can facilitate switching of operators or limbs by a single operator. Thus, for example, by coupling two input foot pedals together, the operator may switch feet during the operation of a device such as an automobile or sewing machine. Alternatively, the pedals may be accessible by multiple users so that switching of operators may be done without changing the operation of the motor being used. It is recognized that in some circumstances, it may be beneficial or necessary to route the device in a certain direction or orientation based on whether pulling or pushing operations are required.

While this particular embodiment of the invention has been shown and described, it is recognized the various modifications thereof will occur to those skilled in the art. Therefore, the scope of the herein-described invention shall be limited solely by the claims appended hereto.

What is claimed is:

1. A force coupling transfer device for transferring a force, comprising:
   an elongated flexible outer sheath; and
   an elongated flexible inner coiled spring positioned inside of the outer sheath for movement therein relative to the outer sheath, the inner coiled spring having opposing first and second ends, the inner coiled spring transferring a force applied to the first end to the second end, the outer sheath length being permeable permitting lubrication of the inner coiled spring, at least one strain relief device disposed around the outer sheath;
   wherein the outer sheath includes a center longitudinal axis, the outer sheath includes a coiled spring, the strain relief device includes a coiled spring having a connecting loop extending generally perpendicular from the center longitudinal axis of the outer sheath;
   wherein the outer sheath includes opposing first and second ends, the outer sheath further including first and second attachment loops disposed at the respective first and second ends, the attachment loops being an integral extension of the coiled spring of the outer sheath.

2. The device of claim 1, wherein the first attachment loop of the outer sheath is coupled to the connecting loop of the strain relief device.

3. The device of claim 1, wherein the inner coiled spring includes a center longitudinal axis, the first end of the flexible inner coiled spring extends parallel to the center longitudinal axis of the inner coiled spring and includes a connecting loop.

4. The device of claim 1, wherein the first and second attachment loops of the outer sheath protrude from and are generally perpendicular to the center longitudinal axis of the outer sheath.

5. A force coupling transfer device for transferring a force between two remote locations comprising:
   an elongated flexible outer coiled spring; and
   an elongated flexible inner coiled spring positioned inside of the outer coiled spring for movement therein relative to the outer coiled spring, the inner coiled spring having a first end and a second end, and the inner coiled spring transfers a force from its first end to its second end in response to a force applied to its first end;
   wherein the outer coiled spring includes a center longitudinal axis and first and second opposing ends, the force coupling transfer device further including a connecting loop extending from the first and second ends, the connecting loops integrally formed with the outer coiled spring.

6. The device of claim 5, wherein the first and second loops are substantially perpendicular to the center longitudinal axis of the outer coiled spring.

7. The device of claim 5, wherein the inner coiled spring includes a center longitudinal axis and first and second opposing ends, the force coupling transfer device further including individual connecting loops extending from the first and second ends integrally formed with the outer coiled spring, the connecting loops having a center axis, the center axis of the connecting loops substantially perpendicular to the center longitudinal axis of the inner coiled spring.

8. An apparatus comprising:
   an input device;
   a controlled device;
   an elongated flexible outer conduit; and
   an elongated flexible inner spring disposed inside of the outer conduit for movement therein relative to the outer conduit, the inner spring having a first and second ends, the first end of the inner spring being connected to the input device, and the second end of the inner spring being opposite connecting to the controlled device, the inner spring transferring a rotational force simultaneously with an axial force applied by the input device to the controlled device;
   wherein the elongated flexible outer conduit includes a center longitudinal axis and the elongated flexible inner spring is configured at least to rotate thereabout the center longitudinal axis during said application of said rotational force and said axial force.

9. The system of claim 8, wherein the outer conduit includes first and second opposing ends, the apparatus further comprising a strain relief device disposed around the outer conduit at one of its first and second ends.

10. The system of claim 9, further comprising first and second support members, wherein the first support member is connected to the first end of the outer conduit and strain relief device, and the second support member is connected to the second end of the outer conduit.

11. The system of claim 10, wherein the input device includes a manually operable crank.

* * * * *